(12) United States Patent
Maeda et al.

(10) Patent No.: US 10,926,314 B2
(45) Date of Patent: Feb. 23, 2021

(54) METHOD FOR JOINING BUMPER MEMBERS AND BUMPER STRUCTURE

(71) Applicant: Kobe Steel, Ltd., Hyogo (JP)

(72) Inventors: Yasuhiro Maeda, Kobe (JP); Toru Hashimura, Kobe (JP); Junya Naitou, Kobe (JP); Hideto Katsuma, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 299 days.

(21) Appl. No.: 15/763,403

(22) PCT Filed: Aug. 22, 2016

(86) PCT No.: PCT/JP2016/074348
§ 371 (c)(1),
(2) Date: Mar. 26, 2018

(87) PCT Pub. No.: WO2017/056783
PCT Pub. Date: Apr. 6, 2017

(65) Prior Publication Data
US 2018/0272414 A1 Sep. 27, 2018

(30) Foreign Application Priority Data
Sep. 28, 2015 (JP) .............................. JP2015-190161

(51) Int. Cl.
*B21D 53/88* (2006.01)
*B21D 19/08* (2006.01)
(Continued)

(52) U.S. Cl.
CPC ............ *B21D 53/88* (2013.01); *B21D 19/08* (2013.01); *B21D 39/06* (2013.01); *B21D 39/20* (2013.01);
(Continued)

(58) Field of Classification Search
CPC ....... B60R 19/023; B60R 19/04; B60R 19/24; B60R 19/34; B60R 19/36; B21D 53/88;
(Continued)

(56) References Cited

U.S. PATENT DOCUMENTS 4,418,457 A * 12/1983 Mueller ................. B21D 39/06
29/237
6,554,333 B2 * 4/2003 Shimotsu ................ B60R 19/34
293/132

(Continued)

FOREIGN PATENT DOCUMENTS

JP   S51-133170 A   11/1976
JP   H09-192760 A    7/1997
(Continued)

OTHER PUBLICATIONS

International Preliminary Report on Patentability issued in corresponding International Patent Application No. PCT/JP2016/074348; dated Apr. 12, 2018; with English translation.
(Continued)

*Primary Examiner* — Gregory A Blankenship
(74) *Attorney, Agent, or Firm* — Studebaker & Brackett PC

(57) ABSTRACT

In a method for joining bumper members, a bumper reinforcement including a rear inclined wall provided with a hole, and a bumper stay in a hollow shape are prepared. The method for joining bumper members includes the steps of: inserting the bumper stay through the hole of the bumper reinforcement to pass through the rear inclined wall; inserting rubber into the bumper stay; and compressing the rubber in a direction of an axis L of the bumper stay to expand the rubber outward from inside to expand and deform at least a
(Continued)

portion of the bumper stay inserted into the hole, thereby joining the bumper stay to the rear inclined wall by press-fitting.

12 Claims, 20 Drawing Sheets

(51) Int. Cl.
*B21D 39/20* (2006.01)
*B60R 19/04* (2006.01)
*B60R 19/24* (2006.01)
*B60R 19/34* (2006.01)
*B21D 39/06* (2006.01)
*B60R 19/02* (2006.01)

(52) U.S. Cl.
CPC .......... *B21D 39/206* (2013.01); *B60R 19/023* (2013.01); *B60R 19/04* (2013.01); *B60R 19/24* (2013.01); *B60R 19/34* (2013.01)

(58) Field of Classification Search
CPC ........ B21D 19/08; B21D 39/06; B21D 39/20; B21D 39/206
See application file for complete search history.

(56) References Cited

U.S. PATENT DOCUMENTS

| | | | | |
|---|---|---|---|---|
| 2009/0243314 | A1* | 10/2009 | Hashimoto | B60R 19/24 293/149 |
| 2009/0277523 | A1 | 11/2009 | Miyazaki et al. | |
| 2010/0295296 | A1* | 11/2010 | Kawamata | B21D 39/06 285/382.5 |
| 2011/0133512 | A1* | 6/2011 | Mildner | B60R 19/36 296/187.09 |
| 2011/0226034 | A1 | 9/2011 | Ohara et al. | |
| 2012/0267908 | A1* | 10/2012 | Kokubo | B60R 19/34 293/133 |
| 2014/0103670 | A1 | 4/2014 | Iijima et al. | |
| 2014/0292007 | A1* | 10/2014 | Kawamata | B60R 19/34 293/133 |
| 2018/0015527 | A1* | 1/2018 | Maeda | B21D 39/206 |
| 2018/0272414 | A1* | 9/2018 | Maeda | B60R 19/023 |
| 2018/0272478 | A1* | 9/2018 | Maeda | B23P 11/005 |
| 2019/0060975 | A1* | 2/2019 | Hashimura | B21D 39/06 |
| 2019/0374994 | A1* | 12/2019 | Maeda | B21D 39/06 |
| 2019/0375355 | A1* | 12/2019 | Maeda | B60R 19/24 |

FOREIGN PATENT DOCUMENTS

| | | |
|---|---|---|
| JP | 2000-210738 A | 8/2000 |
| JP | 2004-340286 A | 12/2004 |
| JP | 2007-283323 A | 11/2007 |
| JP | 2007-284039 A | 11/2007 |
| JP | 2008-037220 A | 2/2008 |
| JP | 2008-068849 A | 3/2008 |
| JP | 2009-274635 A | 11/2009 |
| JP | 2012-236547 A | 12/2012 |

OTHER PUBLICATIONS

International Search Report issued in PCT/JP2016/074348; dated Sep. 20, 2016.
The extended European search report issued by the European Patent Office dated Jun. 24, 2019, which corresponds to European Patent Application No. 16850959.4-1016 and is related to U.S. Appl. No. 15/763,403.

* cited by examiner

METHOD FOR JOINING BUMPER MEMBERS AND BUMPER STRUCTURE

CROSS-REFERENCE TO RELATED APPLICATIONS

This is a national phase application in the United States of International Patent Application No. PCT/JP2016/074348 with an international filing date of Aug. 22, 2016, which claims priority of Japanese Patent Application No. 2015-190161 filed on Sep. 28, 2015 the contents of which are incorporated herein by reference.

TECHNICAL FIELD

The present invention relates to a method for joining bumper members and a bumper structure.

BACKGROUND ART

To reduce weight of automobiles and improve safety thereof, thin steel plates called high tension steels with high strength have been used. While these high tension steels are effective for weight reduction and safety improvement, they are still heavy compared with low specific gravity materials such as aluminum. In addition, high tension steels have problems such as deterioration of formability, increase of forming load, deterioration of dimensional accuracy, and the like, due to their high strength. To solve these problems, multiple-material approach, in which an extrusion, a casting, and a press-formed part, using aluminum with specific gravity less than that of a steel sheet, are used together with a steel component, has been carried out in recent years.

In the multiple-material approach, joining of a steel component and an aluminum component involves problems. A brittle intermetallic compound (IMC) is generated in an interface between a steel plate and an aluminum plate in a welding technique typified by spot welding, so that joining techniques such as electromagnetic forming bonding, screw fastening typified by fastening with a bolt and a nut, friction stir welding (FSW), a riveting, a self-piercing riveting (SPR), mechanical clinching, adhesion, and the like are practically used.

In press-fitting by electromagnetic forming, a solenoid forming coil is inserted into a pipe-like part fitted to a mating part, and an induced current is induced in the pipe-like part being a conductor by a magnetic field changed by applying an impulse current to the solenoid forming coil. An electromagnetic force is generated between a magnetic field generated by a primary current of the solenoid forming coil and the induced current flowing in an opposite direction in a circumferential direction of the pipe-like part. At this time, the pipe-like part receives a radially outward force, and the pipe-like part is deformed and expanded so as to be joined to the mating part by press-fitting. This joining method is suitable for copper and aluminum having good electric conductivity, and is also practically used in joining of automobile parts in some cases.

Patent Document 1 discloses a technique of press-fitting joining by electromagnetic forming for multiple-material approach. In Patent Document 1, a bumper reinforcement made of a shaped metal and having a hollow cross section is deformed and expanded by electromagnetic forming, and the bumper reinforcement is fitted and joined to a hole provided in a bumper stay made of an aluminum alloy.

PRIOR ART DOCUMENT

Patent Document

Patent Document 1: JP 2007-284039 A

SUMMARY OF THE INVENTION

Problems to be Solved by the Invention

As in Patent Document 1, electromagnetic forming is suitable for joining a hollow part made of copper or aluminum having good electrical conductivity to a mating part by press-fitting, and a circular shape is preferable due to its joining mechanism.

Unfortunately, joining by electromagnetic forming requires use of a solenoid coil smaller than an inner diameter of an aluminum part (aluminum pipe). Reducing a diameter of a coil when a small diameter part is joined has problems of difficulty in manufacturing of the coil, and performance and durability thereof. Particularly, regarding the difficulty in manufacturing, it is difficult to form a conductor into a coil shape, so that restrictions on a material and a cross-sectional shape of the conductor are strict. When the conductor is formed into a coil shape, a cross section of the conductor is deformed. In addition, additional capital investment for high voltage capacitors with large capacity or the like, is required. Further, the joining by electromagnetic forming cannot be applied to an aluminum part provided with a rectangular cross section, a hole, or a slit.

It is an object of the present invention to provide a method for joining bumper members, capable of easily joining a bumper stay and a bumper reinforcement to each other by press-fitting while reducing cost without being limited in shape and material.

Means for Solving the Problems

A first aspect of the present invention provides a method for joining bumper members comprising: providing a bumper reinforcement including a first portion provided with a first hole, and a bumper stay in a hollow shape; inserting the bumper stay into the first hole of the bumper reinforcement to pass through the first portion; inserting an elastic body into the bumper stay; and compressing the elastic body in an axial direction of the bumper stay to expand the elastic body outward from inside, thereby expanding and deforming at least a portion of the bumper stay inserted into the first hole to join the bumper stay to the first portion by press-fitting.

According to this method, the elastic body is expanded outward to uniformly enlarge and deform the bumper stay, so that local deformation can be prevented and a load on each member can be reduced. This is because the bumper stay can be uniformly deformed by using properties of the elastic body that uniformly expands outward from its inside after compressed in an axial direction. This enables fitting accuracy to be improved to increase joining strength. In addition, this method is simpler than electromagnetic forming and other processing methods. Electromagnetic forming is usable only for conductive materials, and is limited in cross-sectional shape and dimension of a conductor depending on a coil to be used. In contrast, this method has no limitations with respect to cross-sectional shape or size, regardless of their materials. In addition, this method can be performed with equipment that adds a compressive force to the elastic body, so that there is no need for electrical equipment requiring a capacitor with large capacity. Thus, the bumper reinforcement and the bumper stay can be joined to each other by press-fitting at low cost.

It is preferable that the first hole of the bumper reinforcement has a shape similar to a cross-sectional shape of a portion of the bumper stay inserted into the first hole.

The bumper reinforcement and the bumper stay are similar to each other at a joint portion, so that the bumper stay can be uniformly expanded and deformed to be joined to the bumper reinforcement. As a result, a local load can be prevented from being applied to the bumper reinforcement and the bumper stay.

It is preferable that an outer frame mold is disposed outside the bumper stay, and at least a part of the bumper stay is formed along the outer frame mold, and is joined by press-fitting.

The bumper stay can be deformed into an arbitrary shape by using outer frame molds with various inner surface shapes. A shape of the bumper stay to be acquired by being deformed can be appropriately selected from a viewpoint of component performance, and the bumper stay can be shaped according to its application. In addition, the outer frame mold is disposed to define an area where the bumper stay is expanded and deformed, thereby enabling the amount of deformation to be adjusted with high accuracy.

It is preferable that burring is applied to an edge of the first hole.

Burring is applied to an edge of the hole of the bumper reinforcement, so that strength of the hole of the bumper reinforcement can be increased. Thus the bumper reinforcement can be prevented from being deformed to prevent damage to the bumper stay. In addition, a joining area is increased to enable joining strength of both the members to be increased.

It is preferable that the bumper reinforcement includes a second portion provided with a second hole, and the bumper reinforcement is joined to the bumper stay at the first hole and the second hole by press-fitting.

Joining at two places by press-fitting enable joining strength to be further increased as compared with a case of joining at one place by press-fitting.

It is preferable that the elastic body is separated at a joint portion between the bumper reinforcement and the bumper stay.

The elastic body is separated from the joint portion so that deformation of the joint portion of the bumper reinforcement can be prevented. Specifically, the elastic body is separated so as not to be disposed near the joint portion, so that the bumper stay does not receive an expansion deformation force from the elastic body near the joint portion and does not expand and deform near the joint portion. As a result, the bumper reinforcement does not receive a force from the bumper stay near the joint portion, and the shape of the joint portion can be maintained.

It is preferable that the bumper stay is provided in its inside with a partition wall, and includes an outer wall extending in the axial direction, and a plurality of elastic bodies are inserted into respective spaces partitioned by the partition wall to join the bumper stay by press-fitting.

A plurality of elastic bodies are used for joining by press-fitting, so that stress concentration due to deformation can be prevented, and thus a load on the bumper reinforcement and the bumper stay can be reduced.

It is preferable that the bumper stay is provided at its one end with at least one cut-out portion.

A cut-out portion is provided at an end portion of the bumper stay so that energy absorption efficiency at the time of collision can be improved.

It is preferable that a bumper structure comprising: a bumper reinforcement including a first portion provided with a first hole and a bumper stay in a hollow shape, the bumper reinforcement and the bumper stay being joined to each other by press-fitting, wherein in a state where the bumper stay is inserted through the first hole of the bumper reinforcement to pass through the first portion, and an elastic body is inserted into the bumper stay, the elastic body is compressed in an axial direction of the bumper stay to be expanded outward from inside, thereby expanding and deforming at least a portion of the bumper stay inserted into the first hole to join the bumper stay to the first portion by press-fitting.

Effect of the Invention

According to the present invention, when the elastic body is expanded outward to uniformly expand and deform the bumper stay, the bumper stay and the bumper reinforcement can be easily joined to each other by press-fitting while reducing cost without being limited in shape and material. In addition, local deformation of the bumper reinforcement and the bumper stay can be prevented, so that a load on each of the members can be reduced. As a result, accuracy of the joining by press-fitting can be improved and joining strength can be increased.

BRIEF DESCRIPTION OF THE DRAWINGS

FIG. 9A is a perspective view of a case where a hole shape of a bumper reinforcement and a cross-sectional shape of a bumper stay are similar;

FIG. 9B is a perspective view of a case where a hole shape of a bumper reinforcement and a cross-sectional shape of a bumper stay are not similar;

MODE FOR CARRYING OUT THE INVENTION

Figure 1A:
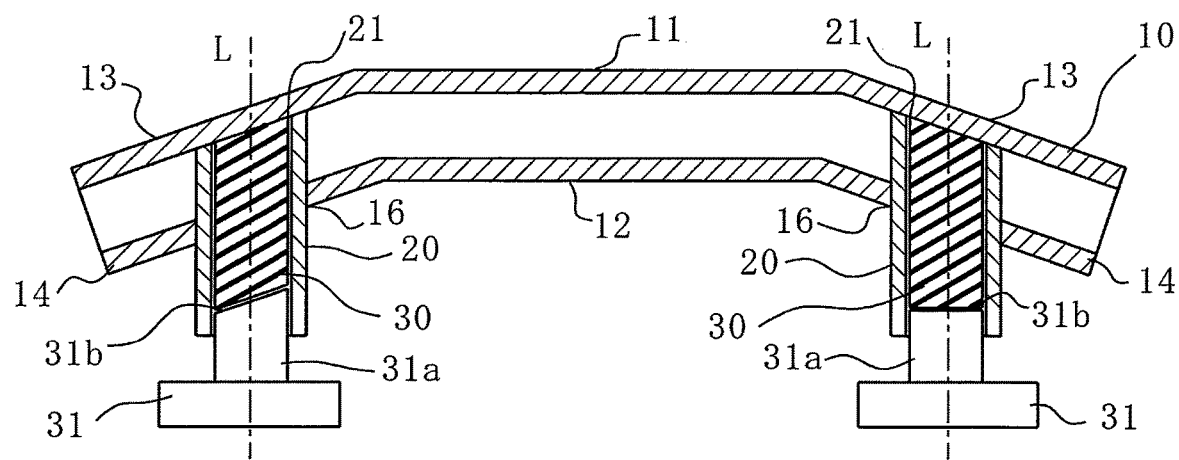
FIG. 1A is a sectional view of a bumper structure according to an embodiment of the present invention before joining by press-fitting.

Embodiments of the present invention will be described below with reference to the accompanying drawings. In each of the embodiments described below, a bumper reinforcement 10 and a bumper stay 20 each are not particularly limited in material, and thus the present invention can be applied to any material.

A method for joining the bumper reinforcement 10 and the bumper stay 20 by press-fitting using rubber (elastic body) 30 will be described with reference to FIGS. 1A to 1C.

The bumper reinforcement 10 is mounted at the front of a structural body such as a vehicle body (not illustrated), and serves to protect the vehicle body from impact. The bumper reinforcement 10 includes: a front wall 11 that extends horizontally on a front side; a rear wall 12 that is disposed parallel to the front wall 11, on a rear side; a front inclined wall 13 that extends obliquely from the front wall 11; and a rear inclined wall (first portion) 14 that is disposed parallel to the front inclined wall 13 and extends from the rear wall 12. The rear inclined wall 14 has a circular hole (first hole) 16 through which the bumper stay 20 is inserted.

The bumper stay 20 is a hollow pipe type extending in the direction of an axis L, having a circular cross section. The bumper stay 20 is formed with a diameter slightly smaller than a diameter of the hole 16 of the bumper reinforcement 10 so as to be able to be inserted into the hole 16. The bumper stay 20 is provided at its one end with an inclined surface 21. The inclined surface 21 is formed so as to be parallel to the front inclined wall 13 when the bumper stay 20 is inserted through the hole 16 of the bumper reinforcement 10.

The rubber 30 has a cylindrical shape extending in the direction of the axis L. The rubber 30 is formed with a diameter slightly smaller than an inner diameter of the bumper stay 20 so as to be able to be inserted into the bumper stay 20. As a material of the rubber 30, it is preferable to use any one of urethane rubber, chloroprene rubber, CNR rubber (chloroprene rubber+nitrile rubber), and silicone rubber, for example. It is preferable that the rubber 30 has a Shore A hardness of 30 or more.

The bumper reinforcement 10 and the bumper stay 20 are joined to each other by press-fitting in the following procedure.

First, as illustrated in FIG. 1A, the bumper stay 20, in which the rubber 30 is inserted, is inserted through the hole 16 of the bumper reinforcement 10 until the inclined surface 21 contacts the front inclined wall 13, and then a pusher 31 is disposed at an end of the bumper stay 20 or the rubber 30. However, the rubber 30 may be inserted into the bumper stay 20 after the bumper stay 20 is inserted through the hole 16 of the bumper reinforcement 10. The pusher 31 is attached to a pressing device or the like (not illustrated), and is driven by the pressing device, whereby a compressive force in the direction of the axis L can be applied to the rubber 30. The pusher 31 has a projecting portion 31a, and presses the rubber 30 with the projecting portion 31a. The projecting portion 31a has a pressing surface 31b that may be inclined according to the shape of the bumper reinforcement 10 or may be flat. The rubber 30 is shorter in overall length than the bumper stay 20. When the rubber 30 is inserted in the bumper stay 20, the end portion of the rubber 30 is positioned inside from the end portion of the bumper stay 20. Thus, when pressing with the pusher 31 starts, the rubber 30 is first pressed. The rubber 30 also may partially project from the bumper stay 20, and the pusher 31 may be flat without having the projecting portion 31a.

Figure 1B:
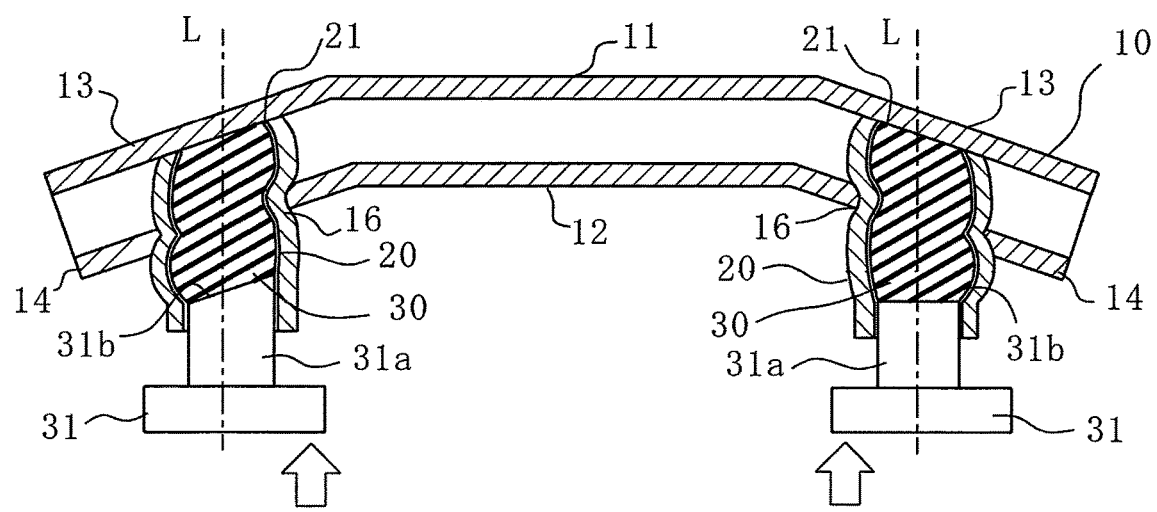
FIG. 1B is a sectional view of the bumper structure according to the embodiment of the present invention during joining by press-fitting.

Next, as illustrated in FIG. 1B, the rubber 30 is pressed in the direction of the axis L by the pusher 31. The rubber 30 is compressed in the direction of the axis L, and increases in radial dimension with decrease in dimension in the direction of the axis L. In this way, the rubber 30 is elastically deformed (expanded) outward from the axis L to expand and deform the bumper stay 20, so that the bumper stay 20 is joined by press-fitting to the rear inclined wall 14 of the bumper reinforcement 10.

Figure 1C:
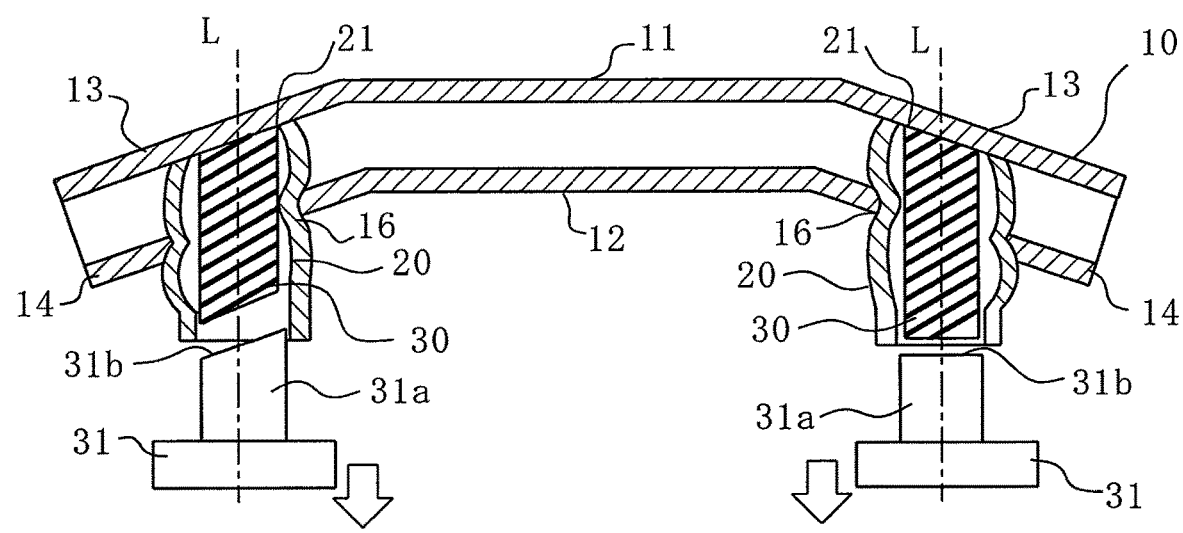
FIG. 1C is a sectional view of the bumper structure according to the embodiment of the present invention after joining by press-fitting.

After joining by press-fitting, as illustrated in FIG. 1C, the rubber 30, from which the compressive force in the direction of the axis L caused by the pusher 31 is removed, can be restored to its original shape by its own elasticity, and thus can be easily removed from the bumper stay 20.

As described above, the rubber 30 is expanded outward to uniformly expand and deform the bumper stay 20, so that local deformation can be prevented and a load on each of the bumper reinforcement 10 and the bumper stay 20 can be reduced. This is because the bumper stay 20 can be uniformly deformed by using properties of the rubber 30 that uniformly expands outward from its inside after compressed in the direction of the axis L. This enables fitting accuracy to be improved to increase joining strength. In addition, this method is simpler than electromagnetic forming and other processing methods. Electromagnetic forming is usable only for conductive materials, and is limited in cross-sectional shape and dimension of a conductor depending on a coil to be used. In contrast, this method has no limitations with respect to cross-sectional shape or size, regardless of its material. In addition, this method can be performed with equipment that adds a compressive force to the rubber 30, so that there is no need for electrical equipment requiring a capacitor with large capacity. Thus, the bumper reinforcement 10 and the bumper stay 20 can be joined to each other by press-fitting at low cost.

In addition, a member to be inserted into the bumper stay 20 is not limited to the rubber 30. For example, a fluid-filled member filled with gas or liquid thereinside may be used instead of the rubber 30. Besides this, any members are available as long as those can be expanded outward by a compressive force in the direction of the axis L so as to expand and deform the bumper stay 20. It is preferable to use a member that deforms uniformly like the rubber 30 when inflating outward in accordance with a compressive force.

Figure 2A:
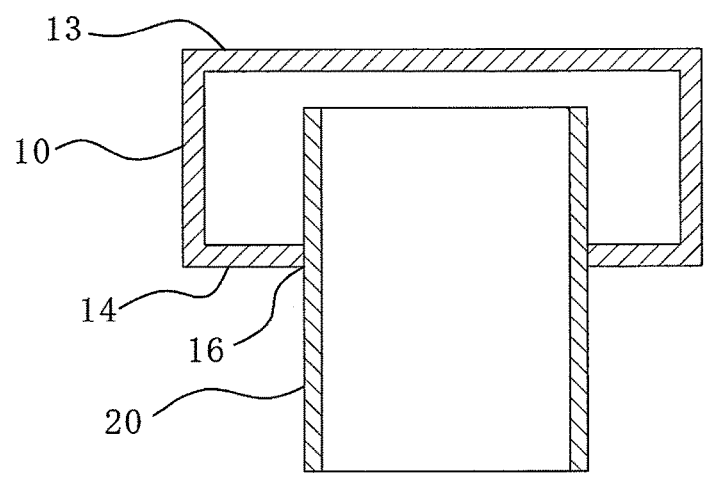
FIG. 2A is a sectional view when the amount of insertion of the bumper stay is small.
Figure 2B:
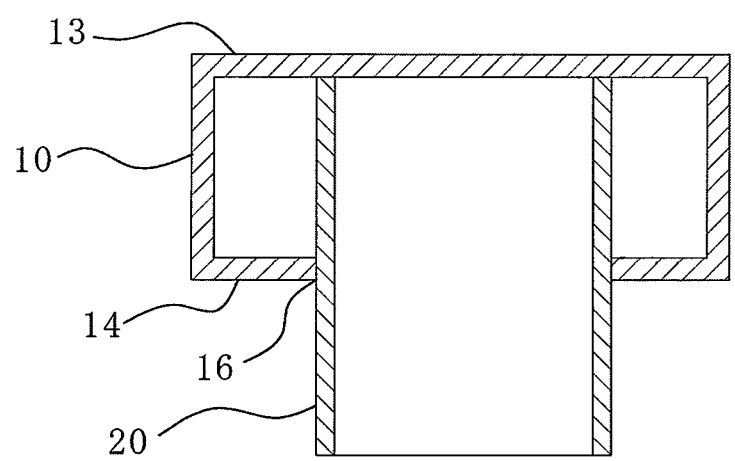
FIG. 2B is a sectional view when the amount of insertion of the bumper stay is medium.
Figure 2C:
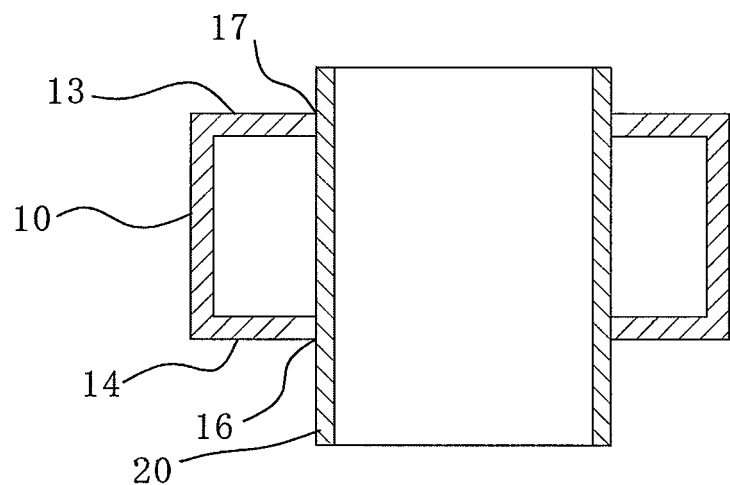
FIG. 2C is a sectional view when the amount of insertion of the bumper stay is large (in the case of penetration)

As illustrated in FIGS. 2A to 2C, the amount of insertion of the bumper stay 20 into the bumper reinforcement 10 may be variously changed. FIG. 2A shows a case where the amount of insertion is small, and an end surface of the bumper stay 20 is not in contact with an inner surface of the bumper reinforcement 10. FIG. 2B shows a case where the amount of insertion is medium, and corresponds to the case of the present embodiment in which the end surface of the bumper stay 20 is in contact with the inner surface of the bumper reinforcement 10. FIG. 2C shows a case where the amount of insertion is large. In this case, the bumper reinforcement 10 has a hole (second hole) 17 that is provided in the front inclined wall (second portion) 13 to be concentric with the hole (first hole) 16 provided in the rear inclined wall (first portion) 14. The bumper stay 20 is inserted through the holes 16 and 17 of the bumper reinforcement 10 to completely pass through the bumper reinforcement 10. In this case, joining by press-fitting are performed at two places, the rear inclined wall 14 provided with the hole 16 and the front inclined wall 13 provided with the hole 17. Joining at two places by press-fitting enable joining strength to be further increased as compared with a case of joining at one place by press-fitting. As described later, energy absorption efficiency for impact changes according to the amount of insertion, so that the present invention can be applied by variously changing the amount of insertion according to application.

Figure 3A:
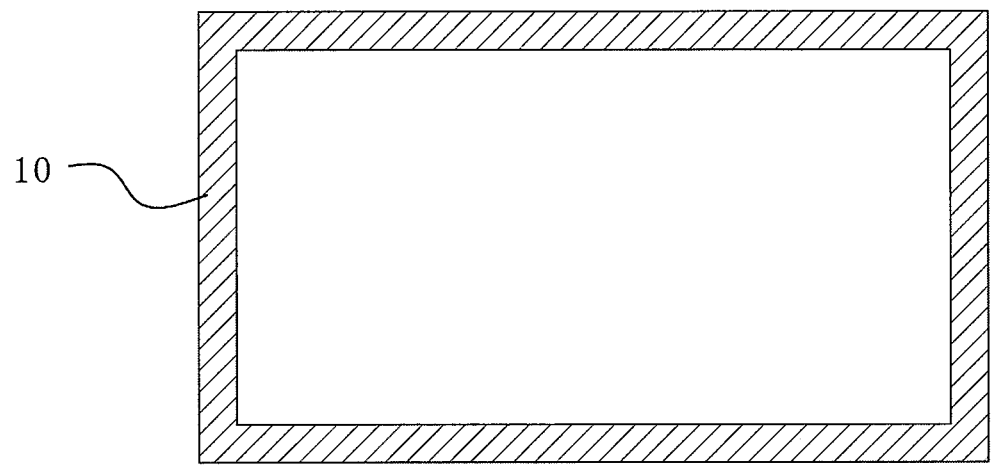
FIG. 3A is a sectional view of a rectangular bumper reinforcement.
Figure 3B:
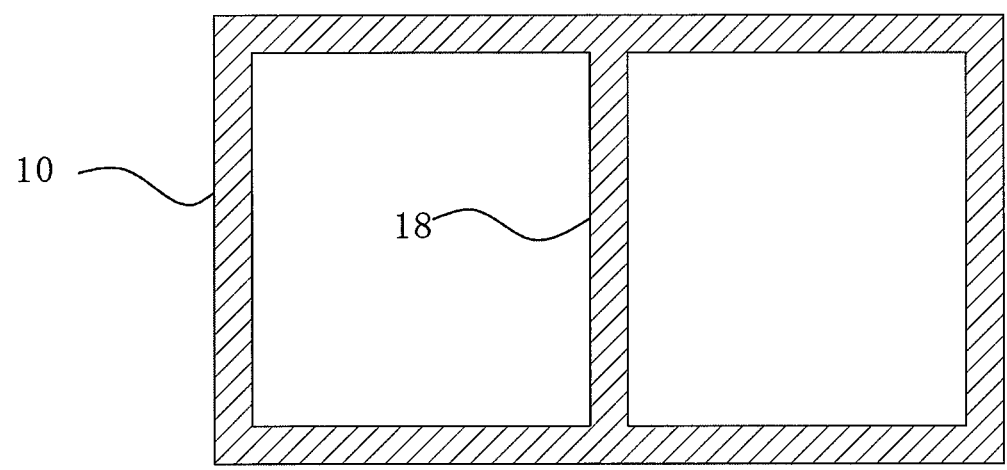
FIG. 3B is a sectional view of a rectangular bumper reinforcement having a partition wall.
Figure 3C:
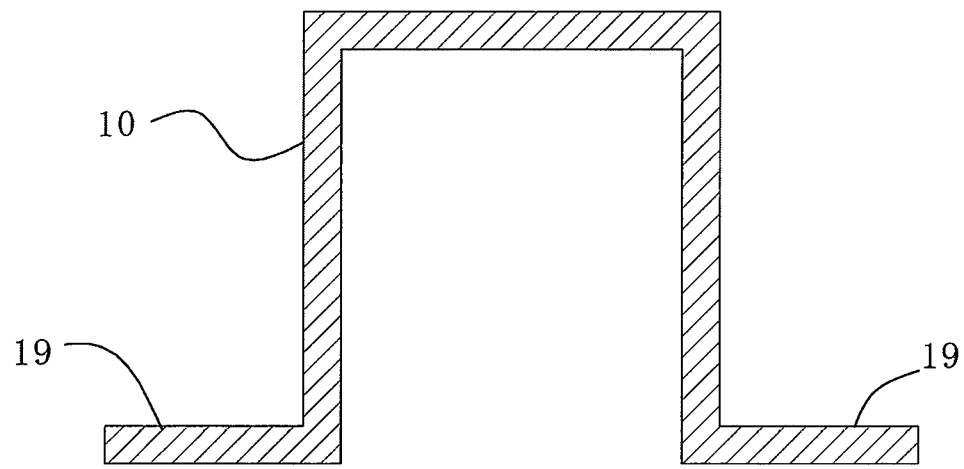
FIG. 3C is a sectional view of a hat-shaped bumper reinforcement.

As illustrated in FIGS. 3A to 3C, the sectional shape of the bumper reinforcement 10 may also be variously changed. FIG. 3A illustrates the bumper reinforcement 10 having a rectangular cross section corresponding to the present embodiment. FIG. 3B illustrates a partition wall 18 provided inside a rectangular cross section, and the partition wall 18 increases strength. FIG. 3C illustrates a hat type that has a flange portion 19, and that can be joined to another member by screwing, welding, or the like using the flange portion 19. The bumper reinforcement 10 is not limited to the case where the bumper reinforcement 10 has the inclined walls 13 and 14 as illustrated in FIGS. 1A to 1C, and the front wall 11 and the front inclined wall 13, as well as the rear wall 12 and the rear inclined wall 14, may be formed as one curved wall.

Figure 4A:
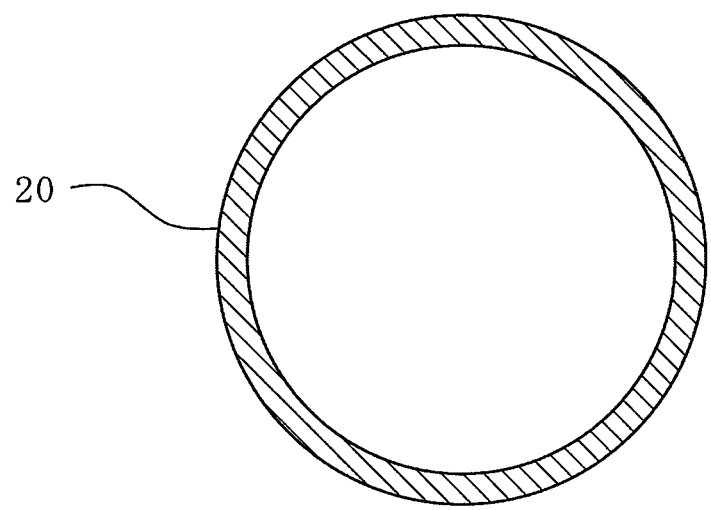
FIG. 4A is a sectional view of a rectangular bumper reinforcement.
Figure 4B:
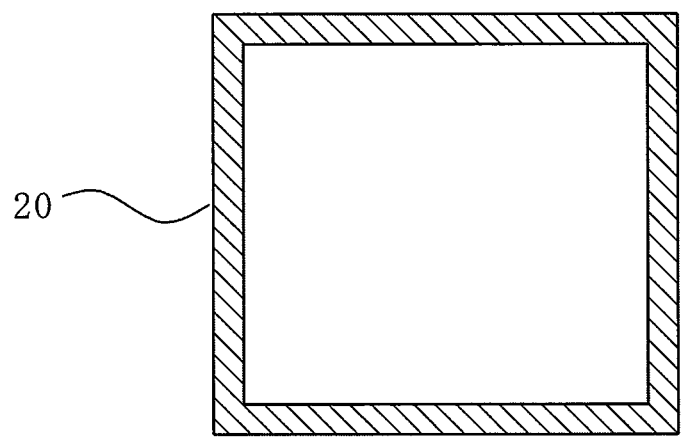
FIG. 4B is a sectional view of a rectangular bumper reinforcement having a partition wall.
Figure 4C:
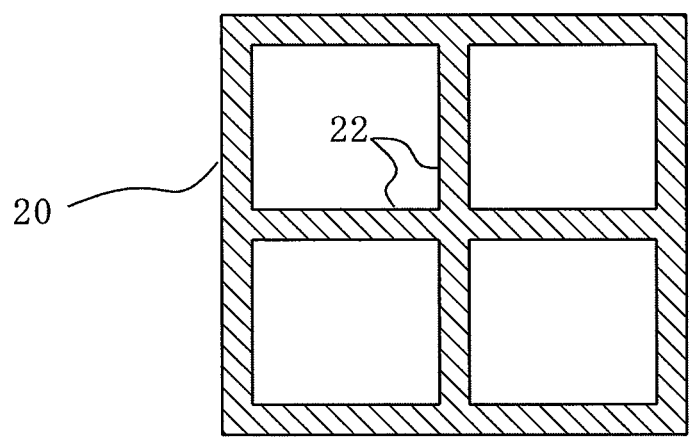
FIG. 4C is a sectional view of a hat-shaped bumper reinforcement.

As illustrated in FIGS. 4A to 4C, the cross-sectional shape of the bumper stay 20 may also be variously changed. FIG. 4A illustrates the bumper stay 20 having a circular cross section corresponding to the present embodiment. FIG. 4B illustrates the bumper stay 20 having a rectangular cross section. FIG. 4C illustrates the bumper stay 20 having a partition wall 22 inside a rectangular cross section to increase strength with the partition wall 22. When the bumper stay 20 has the partition wall 22, a plurality of pieces of rubber 30 to be inserted for joining by press-fitting are required.

Figure 5:
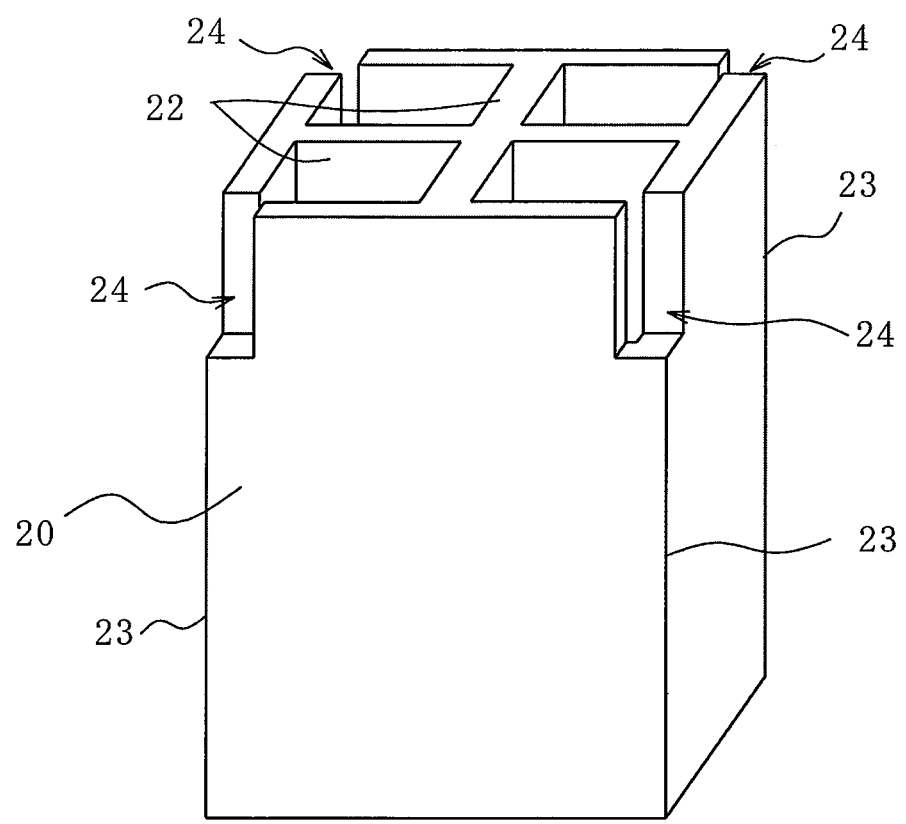
FIG. 5 is a perspective view of a bumper stay having a cut-out portion at an end portion thereof.

As illustrated in FIG. 5, the bumper stay 20 can be changed in shape other than the cross-sectional shape, and may be provided at its end portion with cut-out portions 24. In the present modification, the cut-out portions 24 are provided at end portions in four respective corners 23 of the bumper stay 20 having a rectangular cross section with partition walls 22 dividing the inside of the rectangular cross section into four portions. As described later, energy absorption efficiency for impact is improved by the cut-out portions 24.

Figure 6:
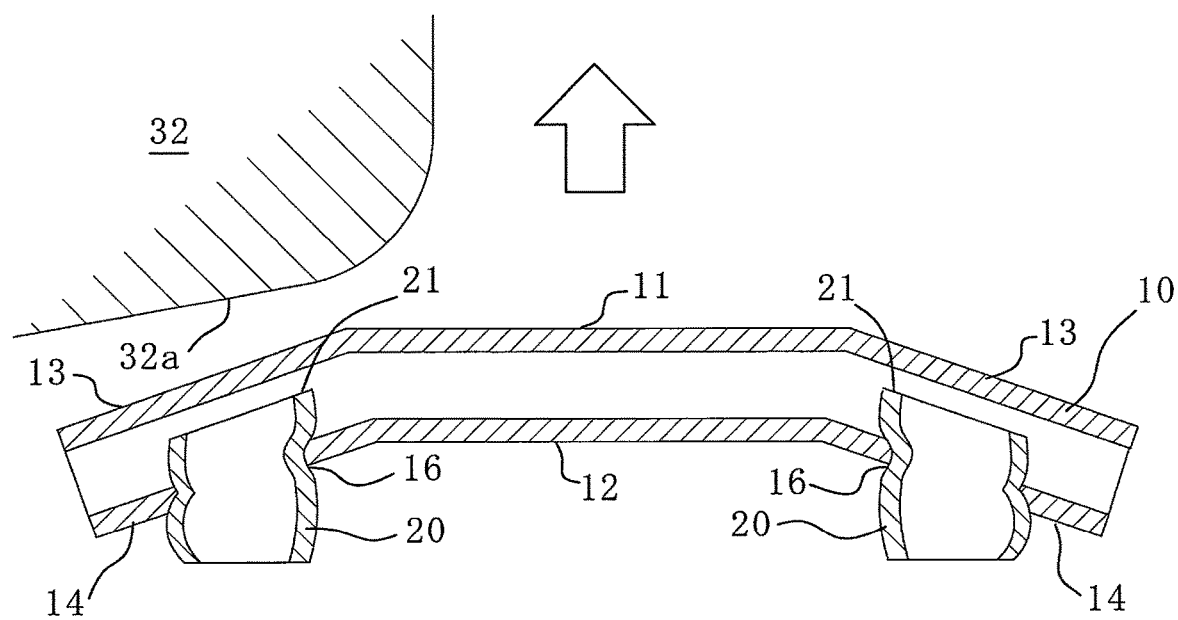
FIG. 6 is a sectional view at the time of an offset collision.

As illustrated in FIG. 6, to investigate energy absorption efficiency for impact on a bumper member in which the bumper reinforcement 10 and the bumper stay 20 are joined to each other by press-fitting, a simulation analysis of an offset collision, by assuming a vehicle body to which the bumper member is mounted, was performed. As placement conditions, a collision wall 32 is offset by about 40% of a width of the vehicle body (not illustrated), and a collision surface 32a of the collision wall 32 is inclined toward the bumper reinforcement 10 and the bumper stay 20 by about 10 degrees.

Figure 7:
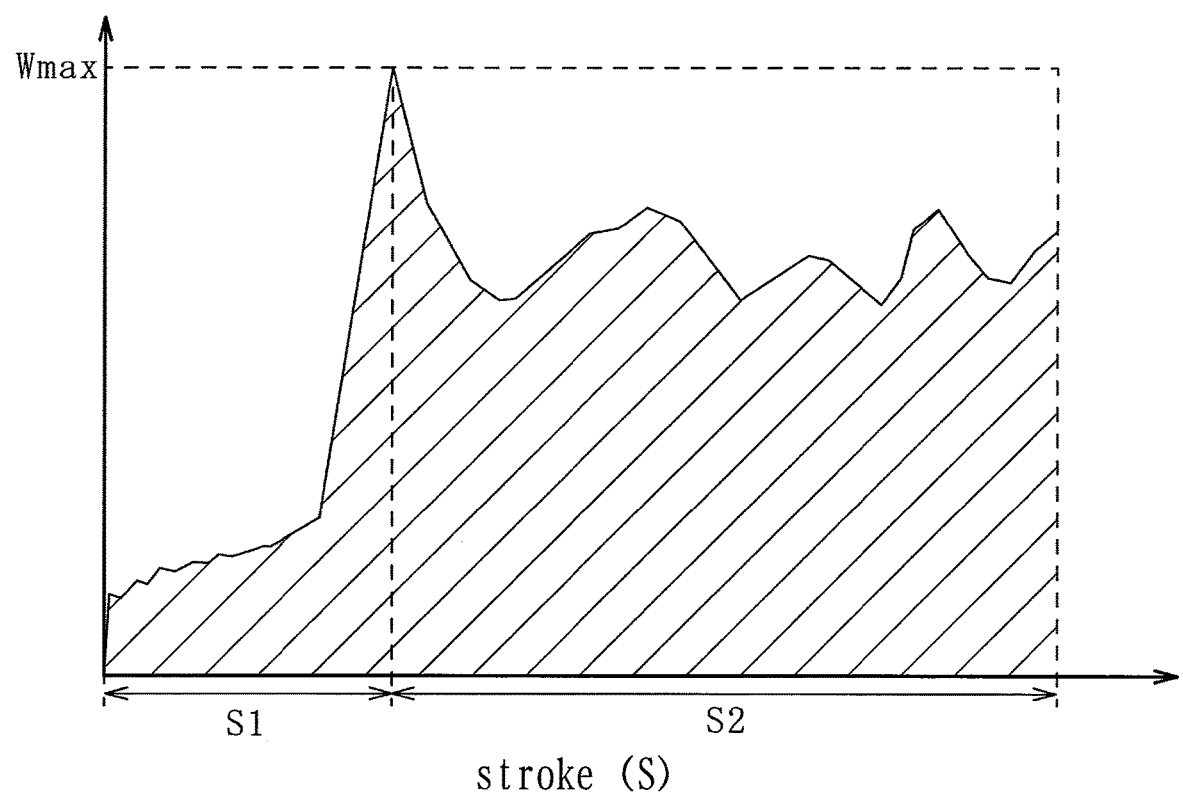
FIG. 7 is a graph showing a relationship between a pushing stroke and a load at the time of an offset collision.

FIG. 7 shows a relationship between load and stroke obtained by the simulation. The horizontal axis of the graph indicates stroke S, and the vertical axis indicates load W. The stroke S and the load W gradually increase after collision, from an original point at start of the collision. Only the bumper reinforcement 10 is collapsed in a region indicated by a stroke S1, and the bumper stay 20 is also collapsed in a region indicated by a stroke S2. Thus, it is understood that deformation of the bumper stay 20 starts after the bumper reinforcement 10 is deformed. The energy absorption efficiency at this time is represented by a ratio of an area of a shaded region surrounded by the graph to an area of a rectangular region indicated by the product of a maximum load Wmax and a full stroke (S1+S2). FIG. 7 shows that a state indicated by the stroke S2 where the bumper stay 20 is also collapsed has loads and an area of a shaded region, larger than those in a state indicated by the stroke S1 where only the bumper reinforcement 10 is collapsed. Thus, it is effective to increase a crush region of the bumper stay 20 indicated by the stroke S2 to increase the energy absorption efficiency. In other words, it is effective to increase the amount of insertion of the bumper stay 20 to crush the bumper stay 20 sooner after collision.

Figure 8:
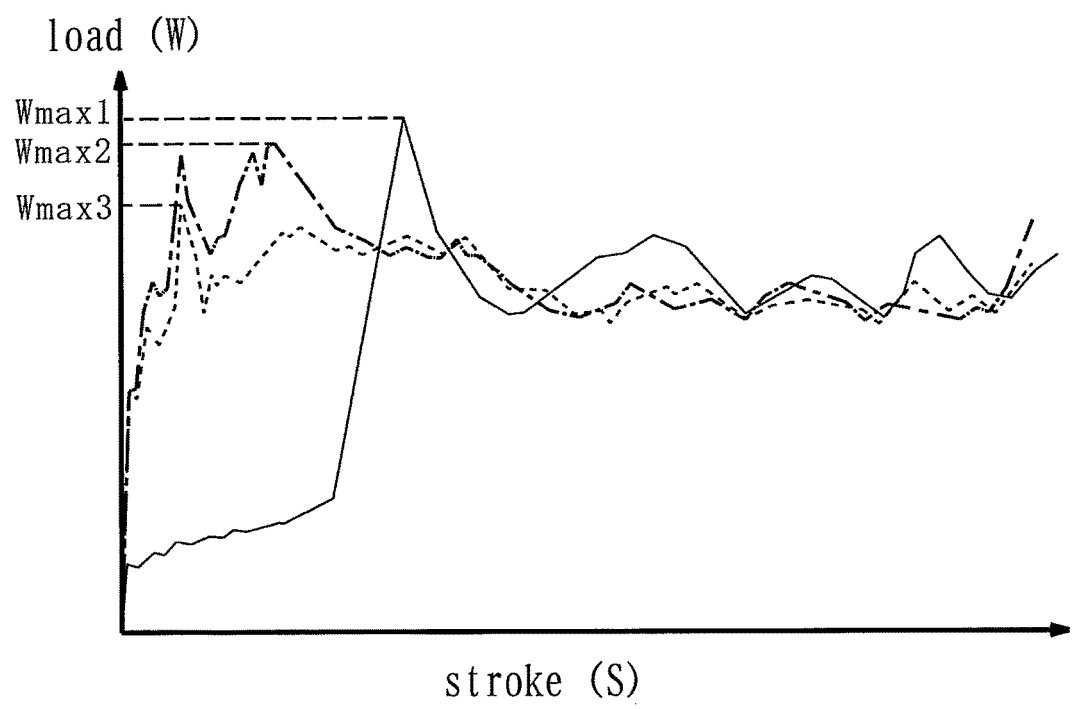
FIG. 8 is a graph of FIG. 7 when the amount of insertion of the bumper stay and a shape thereof are changed.

FIG. 8 is a graph similar to FIG. 7 when the amount of insertion of the bumper stay 20 is changed. FIG. 8 also shows a graph when the cut-out portions 24 are provided in the same bumper stay 20 as illustrated in FIG. 5. The solid line shows a case where the amount of insertion of the bumper stay 20 is small (refer to FIG. 2A). The one-dot chain line shows a case where the amount of insertion of the bumper stay 20 is large (refer to FIG. 2B). The broken line shows a case where the amount of insertion of the bumper stay 20 is large and where the bumper stay 20 is provided at its end portion with the cut-out portions 24 (refer to FIGS. 2B and 5).

Comparing the three graphs of FIG. 8, it is understood that the energy absorption efficiency is highest in the case indicated by the broken line where the amount of insertion is large and the cut-out portions 24 are provided at the end portion of the bumper stay 20. The graph indicated by the solid line and the graph indicated by each of the broken line and the one-dot chain line are different from each other in a size of a crush region (corresponding to the region of the stroke S2 in FIG. 7) of the bumper stay 20. In the graphs of the broken line and the one-dot chain line, deformation of the bumper stay 20 starts from a stage where the stroke S is smaller than that in the graph of the solid line. Thus, a region surrounded by the graph indicated by each of the broken line and the one-dot chain line is large and has high energy absorption efficiency as compared with a region surrounded by the graph indicated by the solid line. The graph indicated by the broken line and the graph indicated by the one-dot chain line are different from each other in a maximum value (Wmax2 and Wmax3) of the loads. The maximum value Wmax3 of the load of the graph indicated by the broken line is smaller than the maximum value Wmax2 of the load of the graph indicated by the one-dot chain line (Wmax3<Wmax2). Accordingly, a value of the product of the maximum load Wmax and the full stroke S also decreases, that is, a denominator for calculating the energy absorption efficiency decreases. Thus, the energy absorption efficiency is highest in the case indicated by the broken line where the amount of insertion is large and the cut-out portions 24 are provided at the end portion of the bumper stay 20.

Figure 9A:
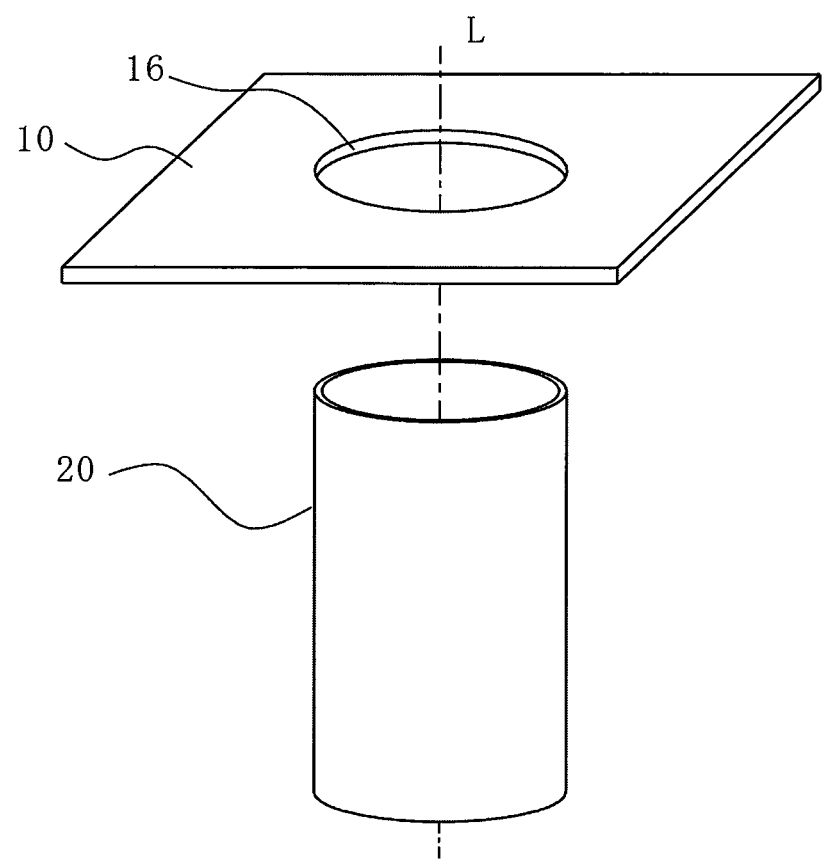
Figure 9B:
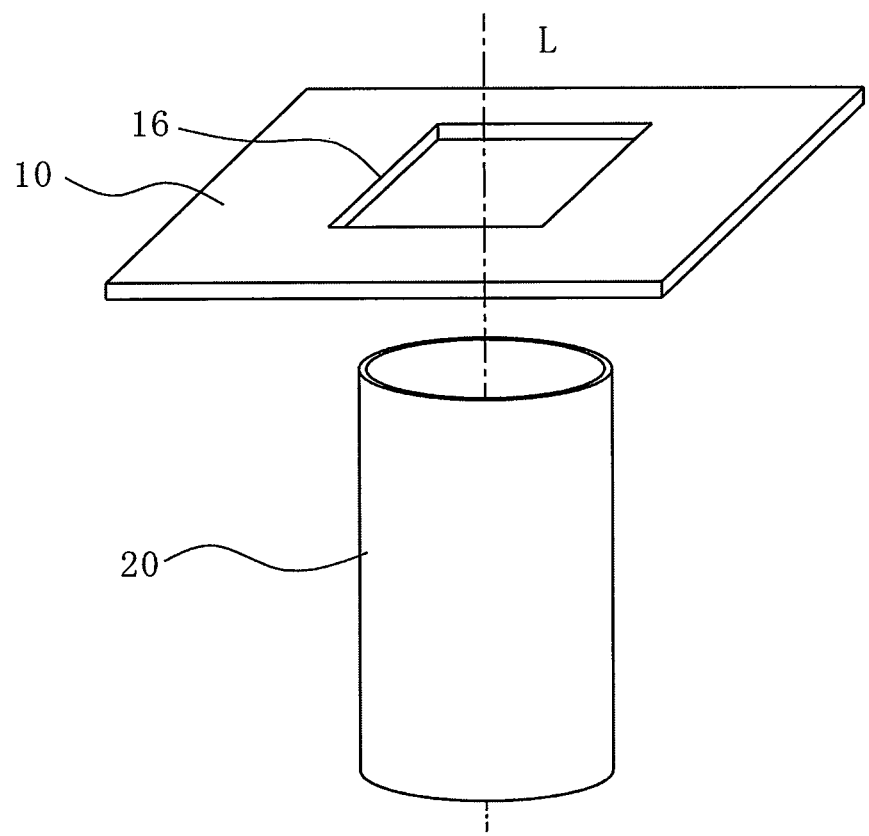

As illustrated in FIG. 9A, it is preferable that the hole 16 provided in the bumper reinforcement 10 has a shape similar to the cross-sectional shape of the bumper stay 20 (both are circular in FIG. 9A). The bumper reinforcement 10 and the bumper stay 20 are similar to each other at a joint portion, so that the bumper stay 20 can be uniformly expanded and deformed to be joined to the bumper reinforcement 10. As a result, a local load can be prevented from being applied to the bumper reinforcement 10 and the bumper stay 20. However, as illustrated in FIG. 9B, even when the hole 16 provided in the bumper reinforcement 10 has a shape that is not similar to the cross-sectional shape of the bumper stay 20 (a rectangular shape and a circular shape in FIG. 9B), the present invention is applicable.

Figure 10A:
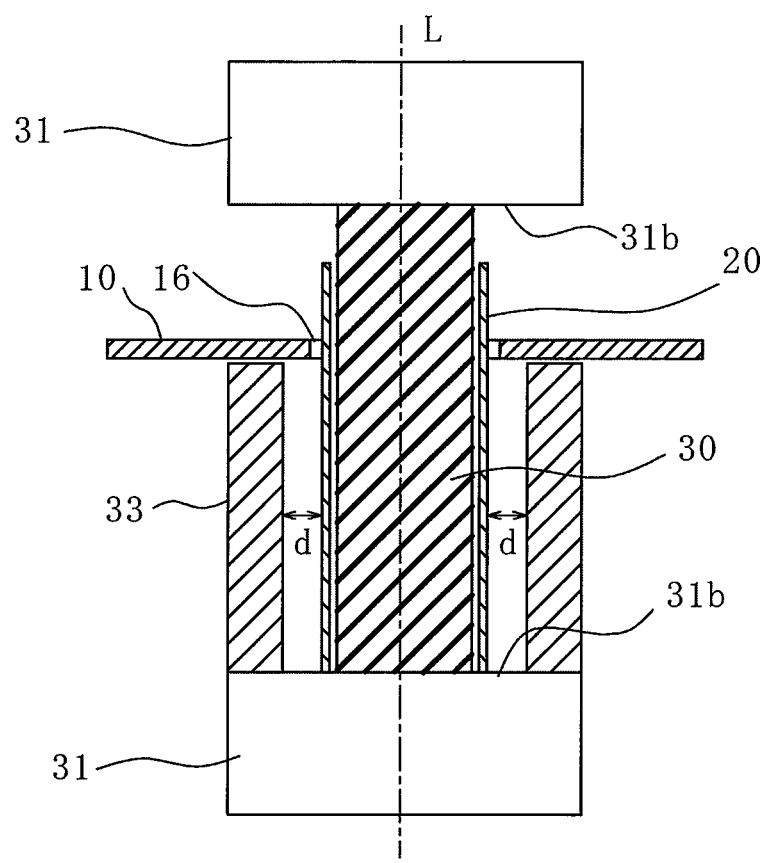
FIG. 10A is a view before joining by press-fitting when an outer frame mold is disposed outside a bumper stay.
Figure 10B:
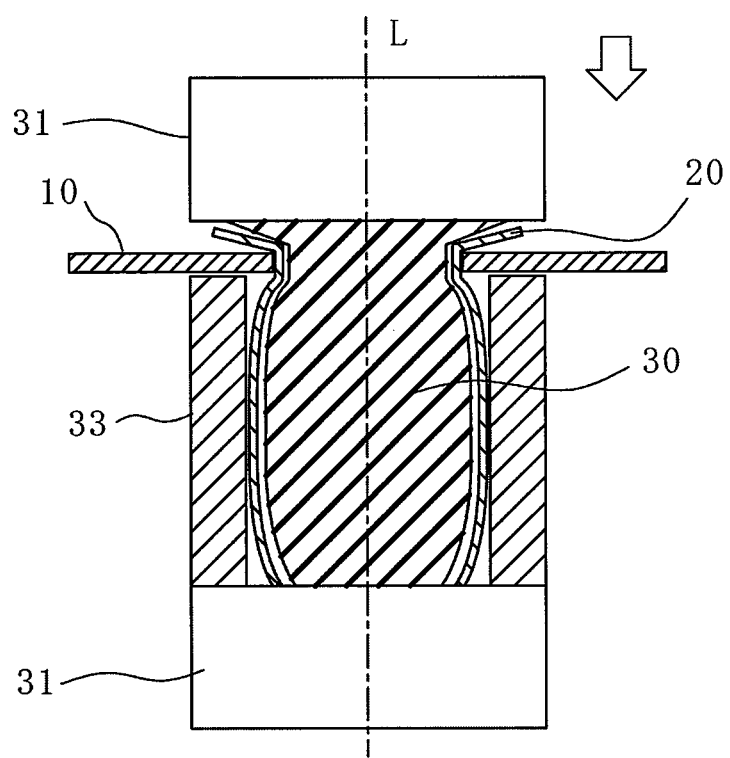
FIG. 10B is a view after joining by press-fitting when the outer frame mold is disposed outside the bumper stay.

As illustrated in FIGS. 10A and 10B, the bumper reinforcement 10 and the bumper stay 20 may be joined by press-fitting by using an outer frame mold 33. The outer frame mold 33 of the present embodiment has a cylindrical shape concentric with the bumper stay 20. The outer frame mold 33 is disposed radially outside the bumper stay 20. In a state before joining by press-fitting, a gap d is provided between the bumper stay 20 and the outer frame mold 33, as illustrated in FIG. 10A. In this state, when the bumper stay 20 is enlarged and deformed by being pushed with the pusher 31 as illustrated in FIG. 10B, the gap d can be eliminated and the bumper stay 20 can coincide with an inner surface shape of the outer frame mold 33. For example, the bumper stay 20 can be deformed into an arbitrary shape by using outer frame molds 33 with various respective inner surface shapes. A shape of the bumper stay to be acquired by being deformed can be appropriately selected from a viewpoint of component performance, and the bumper stay can be shaped according to its application. In addition, the outer frame mold 33 is disposed to define an area where the bumper stay 20 is expanded and deformed, thereby enabling the amount of deformation to be adjusted with high accuracy.

Figure 11A:
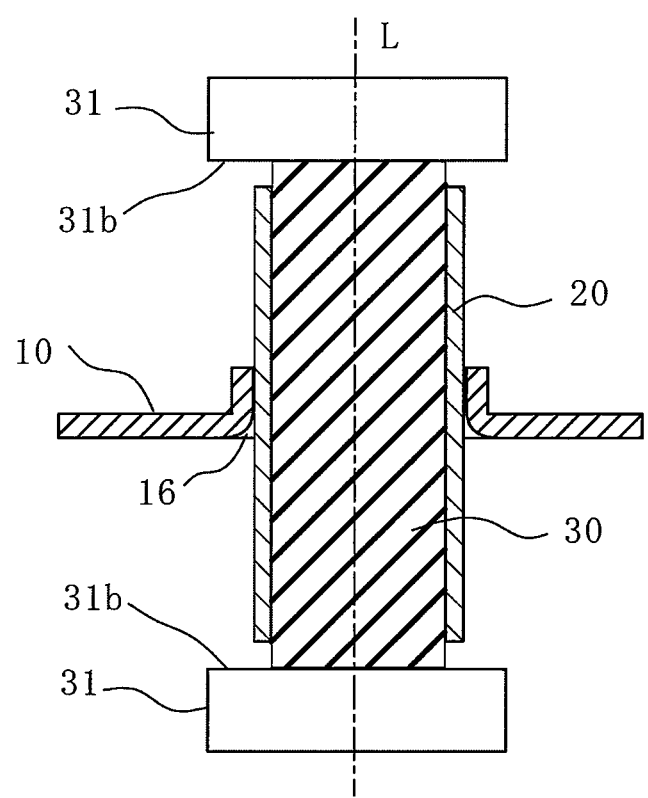
FIG. 11A is a partial sectional view of a bumper reinforcement subjected to burring before joining by press-fitting.
Figure 11B:
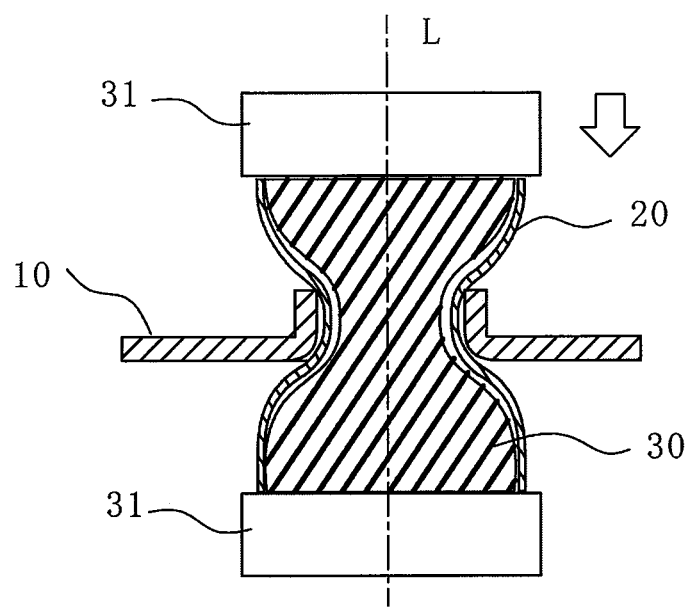
FIG. 11B is a partial sectional view of the bumper reinforcement subjected to burring after joining by press-fitting.

As illustrated in FIGS. 11A and 11B, the hole 16 of the bumper reinforcement 10 may be subjected to burring. The hole 16 of the bumper reinforcement 10 can be increased in strength by burring an edge of the hole 16 of the bumper reinforcement 10, so that deformation of the bumper reinforcement 10 can be prevented so as to prevent damage to the bumper stay 20 caused by deformation of the bumper reinforcement 10. In addition, a joining area is increased by the burring to enable joining strength to be increased.

Figure 12A:
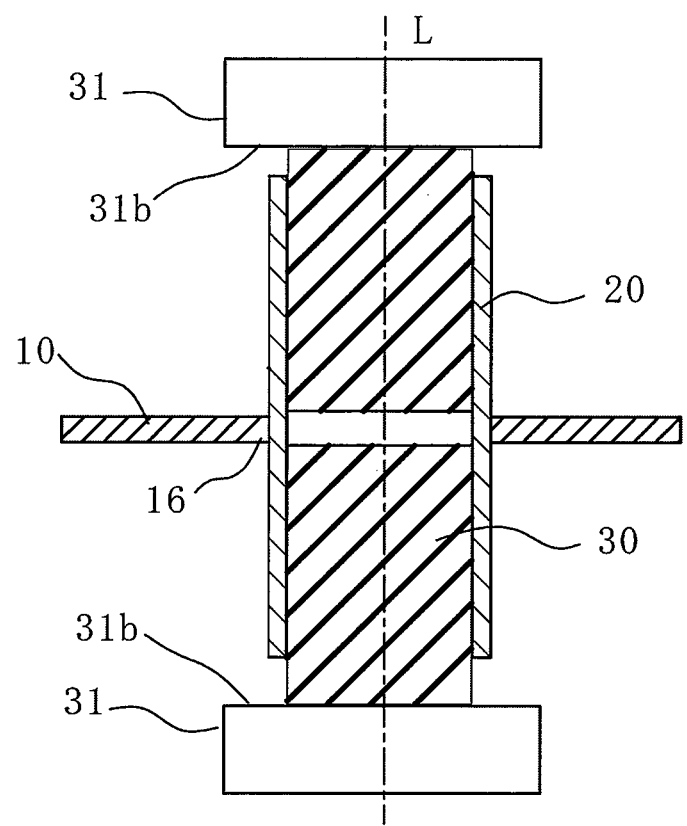
FIG. 12A is a partial sectional view before joining by press-fitting when rubber of a joint portion is separated.
Figure 12B:
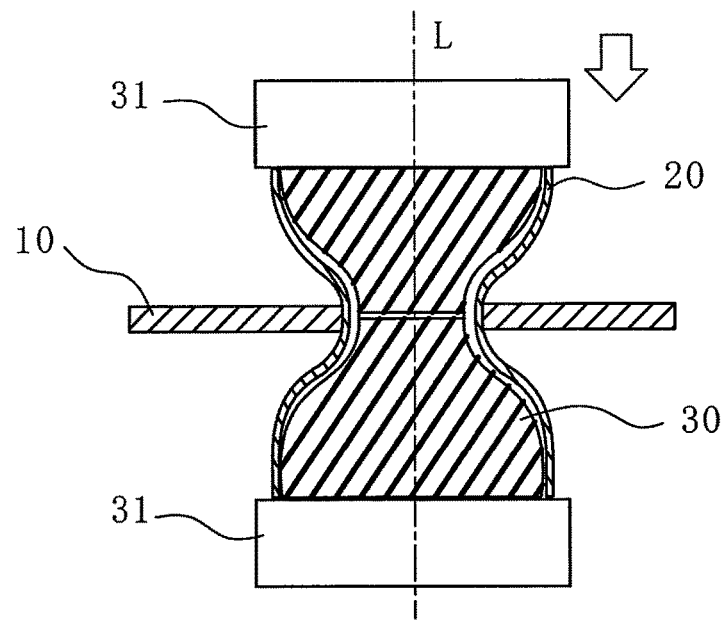
FIG. 12B is a partial sectional view after joining by press-fitting when the rubber of the joint portion is separated.

As illustrated in FIGS. 12A and 12B, the rubber 30 may be separated near the hole 16. The rubber 30 is separated at the hole 16, or at a joint portion, so that deformation of the hole 16 of the bumper stay 20 can be prevented. Specifically, the rubber 30 is separated, so that no enlarging deforming force is applied to the hole 16, and an original shape of the hole 16 can be maintained.

Figure 13A:
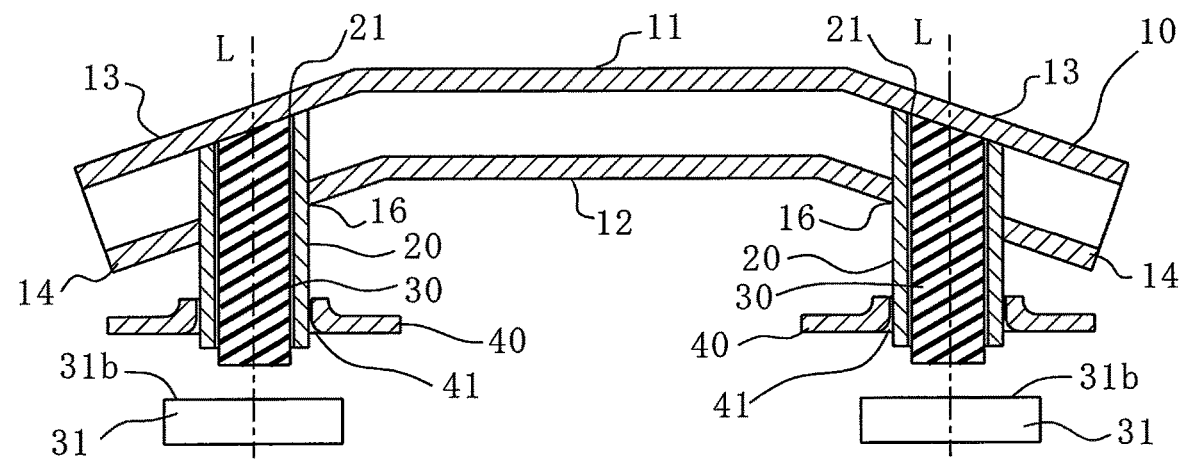
FIG. 13A is a sectional view before joining when an attachment plate is also joined by press-fitting at the same time.
Figure 13B:
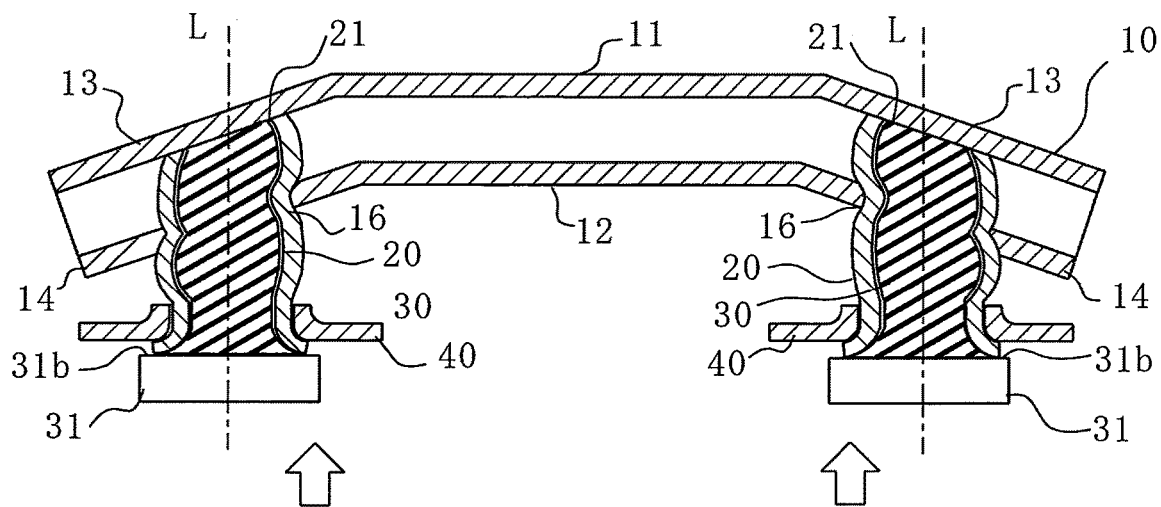
FIG. 13B is a sectional view after joining when the attachment plate is also joined by press-fitting at the same time.

As illustrated in FIGS. 13A and 13B, the bumper stay 20 and the attachment plate 40 may be joined to each other by press-fitting at the same time when the bumper reinforcement 10 and the bumper stay 20 are joined to each other by press-fitting.

The attachment plate 40 has an attachment hole 41 subjected to burring. However, burring of the attachment hole 41 is not necessarily required. The bumper stay 20 is joined by press-fitting while being inserted through the attachment hole 41 of the attachment plate 40 and the hole 16 of the bumper reinforcement 10.

As described above, when a bumper structure is formed by joining the bumper reinforcement 10 and the bumper stay 20 to each other by press-fitting, at the same time the bumper structure can be attached to a member like the attachment plate 40 or the like with the same equipment.

Figure 14A:
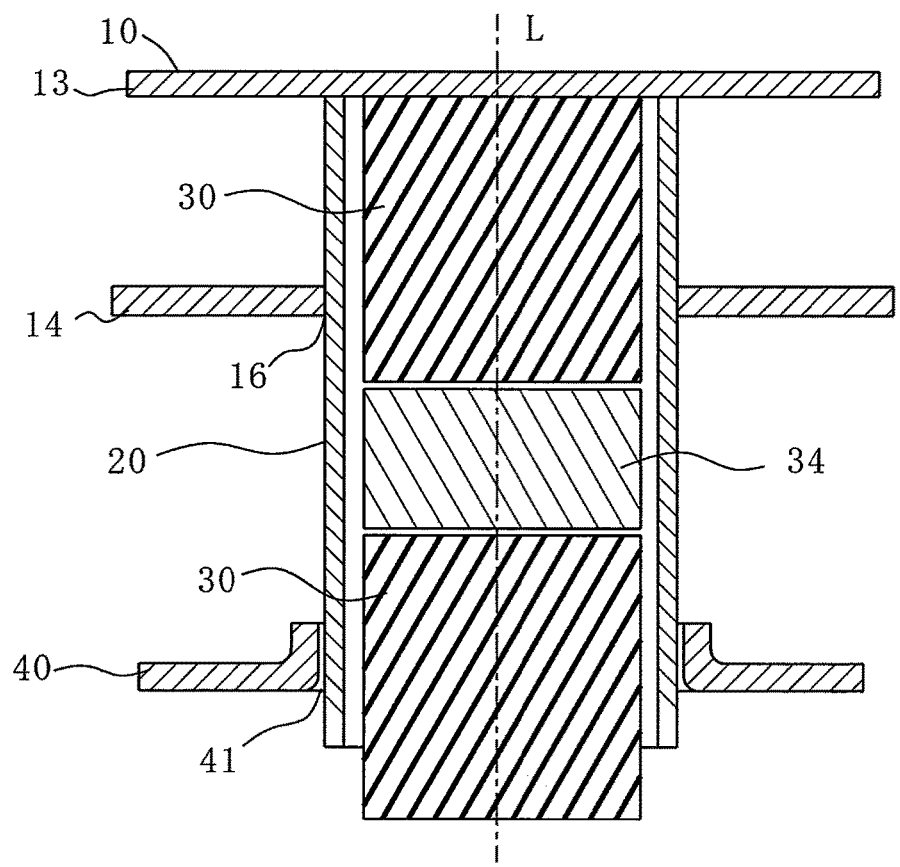
FIG. 14A is a sectional view of the joint portion of FIG. 13A before joining when a core is used.
Figure 14B:
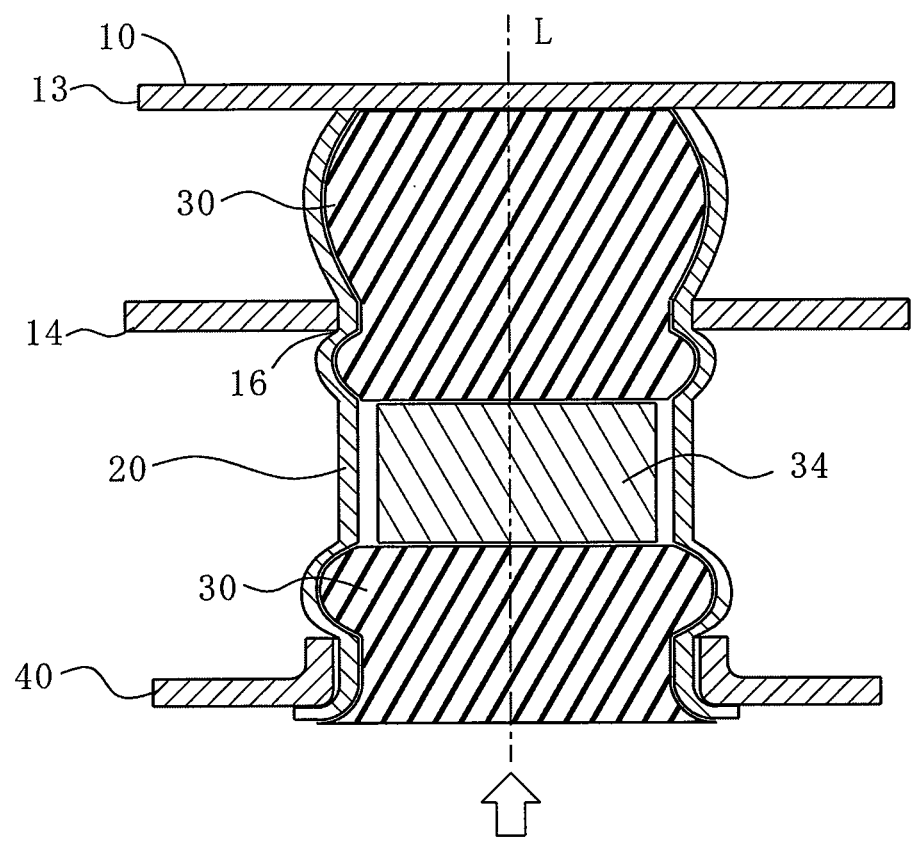
FIG. 14B is a cross-sectional view after joining the joint portion of FIG. 13B when the core is used.

As illustrated in FIGS. 14A and 14B, a core 34 may be used in a case of joining at two places by press-fitting. The core 34 is made of a material which does not elastically deform, and is made of resin or metal, for example. The core 34 is disposed between the rubbers 30 and 30 in the bumper stay 20. At the time of joining by press-fitting, the rubbers 30 and 30 are pressed in the direction of the axis L (direction of the arrow in FIG. 14B) to expand outward the bumper stay 20 from inside with respect to the axis L. However, the core 34 is not deformed even when pressed, so that only joint portions at the two places of the bumper stay 20 can be reliably expanded for joining by press-fitting.

While the specific embodiments of the present invention are described above, the present invention is not limited to the above-described embodiments, and various modifications can be made within the scope of the present invention. For example, a combination of contents of individual modifications may appropriately serve as an embodiment of the present invention.

DESCRIPTION OF SYMBOLS

10 Bumper Reinforcement
11 Front Wall
12 Rear Wall
13 Front Inclined Wall (Second Portion)
14 Rear Inclined Wall (First Portion)
16 Hole (First Hole)
17 Hole (Second Hole)
18 Partition Wall
19 Flange Portion
20 Bumper Stay
21 Inclined Surface
22 Partition Wall
23 Corner
24 Cut-Out Portion
30 Rubber
31 Pusher
31*a* Projecting Portion
31*b* Pressing Surface
32 Collision Wall
32*a* Collision Surface
33 Outer Frame Mold
34 Core
40 Attachment Plate
41 Attachment Hole

The invention claimed is:

1. A method for joining bumper members comprising:
providing a bumper reinforcement including a front wall and a rear wall, the rear wall being provided with a first hole, and
a bumper stay in a hollow shape with openings at both ends;

inserting the bumper stay into the first hole of the bumper reinforcement to pass through the rear wall and abut the front wall;

inserting an elastic body into the bumper stay to abut the front wall; and compressing the elastic body in an axial direction of the bumper stay to expand the elastic body outward from inside, thereby expanding and deforming at least a portion of the bumper stay inserted into the first hole to join the bumper stay to the rear wall by press-fitting.

2. The method for joining bumper members according to claim 1, wherein the first hole of the bumper reinforcement has a shape similar to a cross-sectional shape of a portion of the bumper stay inserted into the first hole.

3. The method for joining bumper members according to claim 1, wherein an outer frame mold is disposed outside the bumper stay, and at least a part of the bumper stay is formed along the outer frame mold, and is joined by press-fitting.

4. The method for joining bumper members according to claim 1, wherein burring is applied to an edge of the first hole.

5. The method for joining bumper members according to claim 1, wherein the elastic body is separated at a joint portion between the bumper reinforcement and the bumper stay.

6. The method for joining bumper members according to claim 1, wherein the bumper stay is provided in its inside with a partition wall, and includes an outer wall extending in the axial direction, and a plurality of elastic bodies are inserted into respective spaces partitioned by the partition wall to join the bumper stay by press-fitting.

7. The method for joining bumper members according to claim 1, wherein the bumper stay is provided at its one end with at least one cut-out portion.

8. The method for joining bumper members according to claim 2, wherein an outer frame mold is disposed outside the bumper stay, and at least a part of the bumper stay is formed along the outer frame mold, and is joined by press-fitting.

9. The method for joining bumper members according to claim 2, wherein burring is applied to an edge of the first hole.

10. The method for joining bumper members according to claim 2, wherein the elastic body is separated at a joint portion between the bumper reinforcement and the bumper stay.

11. The method for joining bumper members according to claim 2, wherein the bumper stay is provided in its inside with a partition wall, and includes an outer wall extending in the axial direction, and a plurality of elastic bodies are inserted into respective spaces partitioned by the partition wall to join the bumper stay by press-fitting.

12. The method for joining bumper members according to claim 2, wherein the bumper stay is provided at its one end with at least one cut-out portion.

* * * * *